US010817908B1

(12) United States Patent
Ross

(10) Patent No.: US 10,817,908 B1
(45) Date of Patent: Oct. 27, 2020

(54) SYSTEM FOR PROVIDING A PROMOTION AT A POINT-OF-SALE TERMINAL BASED UPON AN INAUDIBLE PROMOTION SIGNAL AND RELATED METHODS

(71) Applicant: INMAR ANALYTICS, INC., Winston-Salem, NC (US)

(72) Inventor: John Ross, Kennesaw, GA (US)

(73) Assignee: INMAR ANALYTICS, INC., Winston-Salem, NC (US)

(*) Notice: Subject to any disclaimer, the term of this patent is extended or adjusted under 35 U.S.C. 154(b) by 1279 days.

(21) Appl. No.: 14/603,970

(22) Filed: Jan. 23, 2015

Related U.S. Application Data

(60) Provisional application No. 61/931,472, filed on Jan. 24, 2014.

(51) Int. Cl.
*G06Q 30/02* (2012.01)
(52) U.S. Cl.
CPC ..... *G06Q 30/0268* (2013.01); *G06Q 30/0267* (2013.01)
(58) Field of Classification Search
CPC .............. G06Q 30/0268; G06Q 30/0267
See application file for complete search history.

(56) References Cited

U.S. PATENT DOCUMENTS

| 6,401,074 | B1* | 6/2002 | Sleeper | G06Q 20/20 235/383 |
| 7,050,756 | B2 | 5/2006 | Atkinson | |
| 8,462,645 | B1 | 6/2013 | Harb | |
| 8,514,662 | B2* | 8/2013 | Paulson | H04B 11/00 367/135 |
| 2003/0144035 | A1 | 7/2003 | Weinblatt et al. | |
| 2011/0029370 | A1* | 2/2011 | Roeding | G06Q 30/00 705/14.38 |
| 2011/0087552 | A1* | 4/2011 | Carver | G06Q 30/02 705/14.72 |
| 2012/0051187 | A1 | 3/2012 | Paulson | |

(Continued)

FOREIGN PATENT DOCUMENTS

| WO | 97/21200 A2 | 6/1997 |
| WO | 2013/166158 A1 | 7/2013 |

*Primary Examiner* — Colleen A Hoar
(74) *Attorney, Agent, or Firm* — Allen, Dyer, Doppelt + Gilchrist, P.A. Attorneys at Law

(57) ABSTRACT

A system may include wireless broadcast receivers and a wireless broadcast station configured to broadcast a wireless signal causing each of the wireless broadcast receivers to generate an audible advertisement and an inaudible promotion signal associated therewith. The inaudible promotion signal may be for promotion subscribers. The system may also include a digital promotions network (DPN) device, and a mobile wireless communications device carried by a given subscriber and that may include a microphone, a wireless transceiver, and a processor cooperating with the microphone and the wireless transceiver to wirelessly send notification of the inaudible promotion signal to the DPN device based upon receiving the inaudible promotion signal from a proximate one the wireless broadcast receivers. The DPN device may provide, after receiving the notification of the inaudible promotion signal, the given subscriber with the promotion associated with the inaudible promotion signal at a point-of-sale (POS) terminal.

32 Claims, 7 Drawing Sheets

(56) References Cited

U.S. PATENT DOCUMENTS

| | | |
|---|---|---|
| 2012/0295560 A1 | 11/2012 | Mufti |
| 2013/0179250 A1* | 7/2013 | Nguyen ............... G06Q 20/387 |
| | | 705/14.36 |
| 2013/0179275 A1 | 7/2013 | Harb |
| 2013/0288723 A1 | 10/2013 | Bell et al. |
| 2014/0029768 A1 | 1/2014 | Hong et al. |
| 2014/0046775 A1 | 2/2014 | Harb |
| 2014/0279021 A1 | 9/2014 | Macneille et al. |
| 2014/0303991 A1* | 10/2014 | Frank ................. G06Q 30/0251 |
| | | 705/2 |
| 2014/0304068 A1 | 10/2014 | Weinblatt et al. |

* cited by examiner

SYSTEM FOR PROVIDING A PROMOTION AT A POINT-OF-SALE TERMINAL BASED UPON AN INAUDIBLE PROMOTION SIGNAL AND RELATED METHODS

RELATED APPLICATION

The present application is based upon previously filed provisional application Ser. No. 61/931,472, filed Jan. 24, 2014, the entire subject matter of which is incorporated by reference in its entirety.

TECHNICAL FIELD

The present disclosure relates to the field of communications, and more particularly, to communication of promotions and related methods.

BACKGROUND

It may be particularly desirable to increase efficiency of an advertisement, for example, for increasing sales of a product and/or service. Additionally, a retailer or manufacturer may give a relatively high value to consumer or buyer information, for example, age, sex, income level, geographic location, etc. This information may be used to further increase marketing efficiency and thus sales of the given product and/or service.

However, it may be relatively difficult to gather desired information about a consumer, as many consumers will generally not provide this type of information absent some kind of received benefit from providing this information. One way of enticing a consumer to purchase a given product or service, or to provide desired information, is to offer a corresponding promotion, for example, which may be in the form of a coupon or discount toward the product or service. Still however, traditionally, effort may be required on the part of the consumer, for example, to cut a coupon, remember to take it with them to the retailer when the corresponding good or service is to be purchased. Accordingly, it may be desirable to electronically provide the promotion, for example, along with other information such as to increase consumer participation in providing information and redeeming the promotion. Information regarding redemption of the promotion may also be desirable, for example, as a measure of advertising efficiency.

Several references disclose transmitting coupon information using inaudible data along with other information. For example, PCT Application Publication No. WO 97/21200 to Lee et al. is directed to a hidden transport electronic coupon system. In particular, Lee et al. discloses electronic coupon information embedded in an audio or video signal using a hidden data transport system. A point-of-sale (POS) terminal may interface with the electronic coupon information to credit the consumer with the appropriate discount. The retailer may transmit a database which records the transaction to a manufacturer.

U.S. Patent Application No. 2012/02595560 to Mufti discloses sonic signaling communication for user devices. More particularly, Mufti discloses a broadcast device that transmits audible and inaudible components associated with primary and secondary information, respectively. The primary information is audibly transmitted by a broadcast device for reception by a user. The inaudible component is received by a user device configured to take action responsive to receipt of the secondary information.

SUMMARY

A system may include a plurality of wireless broadcast receivers and a wireless broadcast station configured to broadcast a wireless signal causing each of the plurality of wireless broadcast receivers to generate an audible advertisement and an inaudible promotion signal associated therewith. The promotion signal may be for a plurality of promotion subscribers. The system may also include a digital promotions network (DPN) device and a mobile wireless communications device carried by a given subscriber. The mobile wireless connection device may include a microphone, a wireless transceiver, and a processor cooperating with the microphone and the wireless transceiver to wirelessly send notification of the inaudible promotion signal to the DPN device based upon receiving the inaudible promotion signal from a proximate one of the plurality of wireless broadcast receivers. The DPN device may provide, after receiving the notification of the inaudible promotion signal, the given subscriber with the promotion associated with the inaudible promotion signal at a point-of-sale (POS) terminal. Accordingly, the system may provide a promotion associated with an audible advertisement at a POS terminal, which may in turn increase sales or marketing efficiency as well as may provide an associated efficacy of the audible advertisement, for example, measured by the use of the promotion.

The mobile wireless communications device may include a memory coupled to the processor. The DPN device may be configured to send a promotion record for storage on the memory.

The DPN device may be configured to store a promotion record, for example. The mobile wireless communications device may include a display coupled to the processor. The processor may be configured to display a promotion record on the display, for example.

The processor may cooperate with the wireless transceiver to wirelessly send metadata relating to the inaudible promotion signal to the DPN device. The metadata may include at least one of a timestamp, a subscriber location, and an identification of the audible advertisement, for example. The DPN device may be configured to provide external access to at least some of the metadata.

The wireless broadcast station may be configured to broadcast the wireless signal to cause a given wireless broadcast receiver to generate the audible advertisement and inaudible promotion signal at a same time. The wireless broadcast station may be one of an FM radio station, an AM station, a TV station, for example. The wireless transceiver may be a cellular transceiver.

A method aspect is directed to a method of providing a promotion associated with an inaudible promotion signal at a point-of-sale (POS) terminal. The method may include receiving, via a processor of a digital promotion network (DPN) device, a notification of the inaudible promotion signal for a plurality of promotion subscribers from a mobile wireless communications device carried by a given subscriber. The mobile wireless communications device wirelessly sends the notification of the inaudible promotion signal to the DPN device based upon receiving the inaudible promotion signal from a proximate one of a plurality of wireless broadcast receivers. The plurality of wireless broadcast receivers each generates an audible advertisement and the inaudible promotion signal associated therewith caused by a wireless broadcast station configured to broadcast a wireless signal. The method also includes providing, via the processor, after receiving the notification of the inaudible promotion signal, the given subscriber with the promotion associated with the inaudible promotion signal at the point-of-sale (POS) terminal.

Another method aspect is directed to a method of processing a promotion using a mobile wireless communications device carried by a given subscriber of a plurality thereof. The method includes using a processor cooperating with a microphone and a wireless transceiver to wirelessly receive an inaudible promotion signal generated by a proximate one of a plurality of wireless broadcast receivers. Each of the plurality of wireless broadcast receivers generates an audible advertisement and an inaudible promotion signal associated therewith caused by a wireless broadcast station configured to broadcast a wireless signal. The inaudible promotion signal is for the plurality of promotion subscribers. The method also includes using the processor to wirelessly send notification of the inaudible promotion signal to a digital promotions network (DPN) device based upon receiving the inaudible promotion signal from the proximate one of the plurality of wireless broadcast receivers so that the DPN device provides, after receiving the notification of the inaudible promotion signal, the given subscriber with the promotion associated with the inaudible promotion signal at a point-of-sale (POS) terminal.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
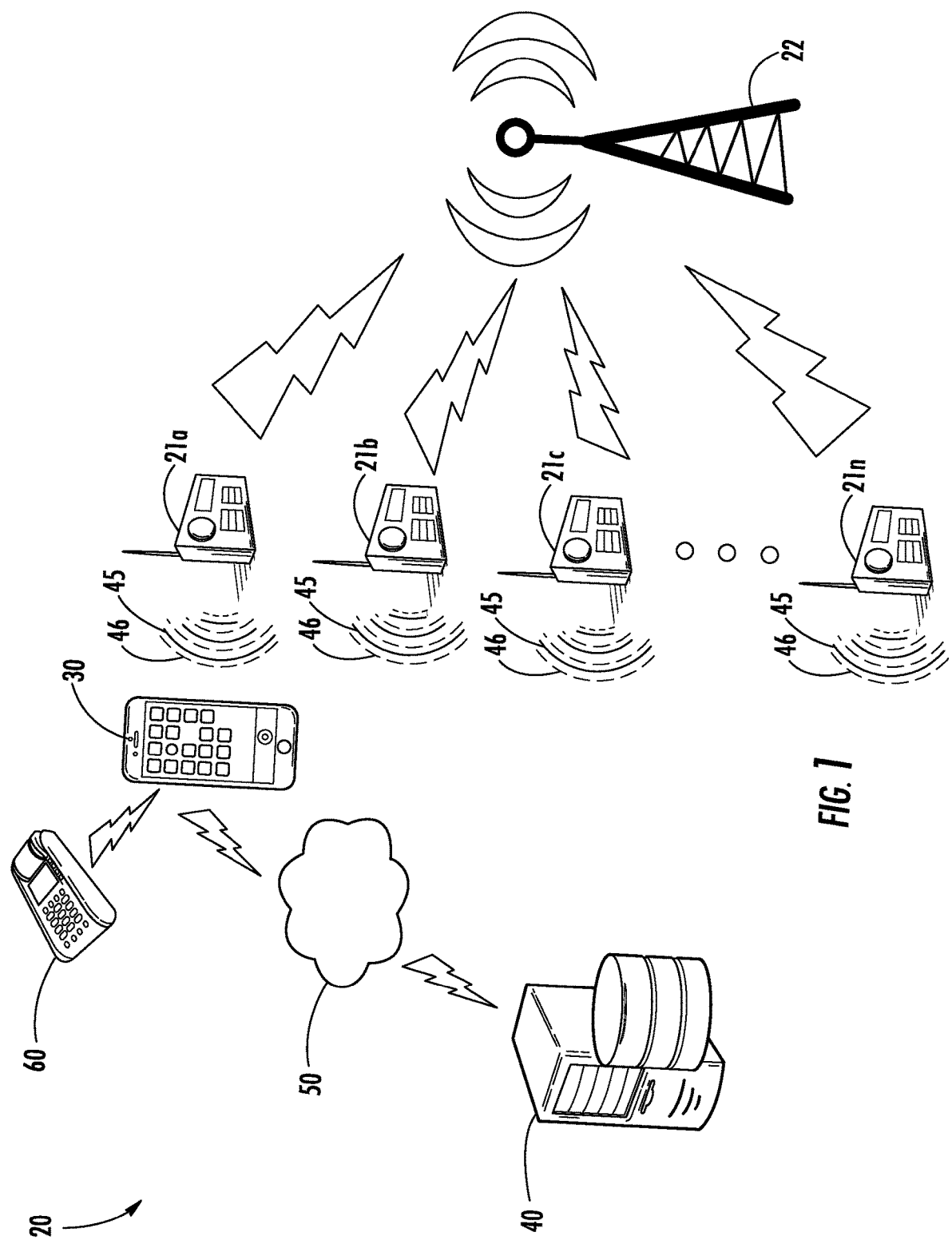
FIG. 1 is a schematic diagram of a system in accordance with an embodiment of the present invention.
Figure 2:
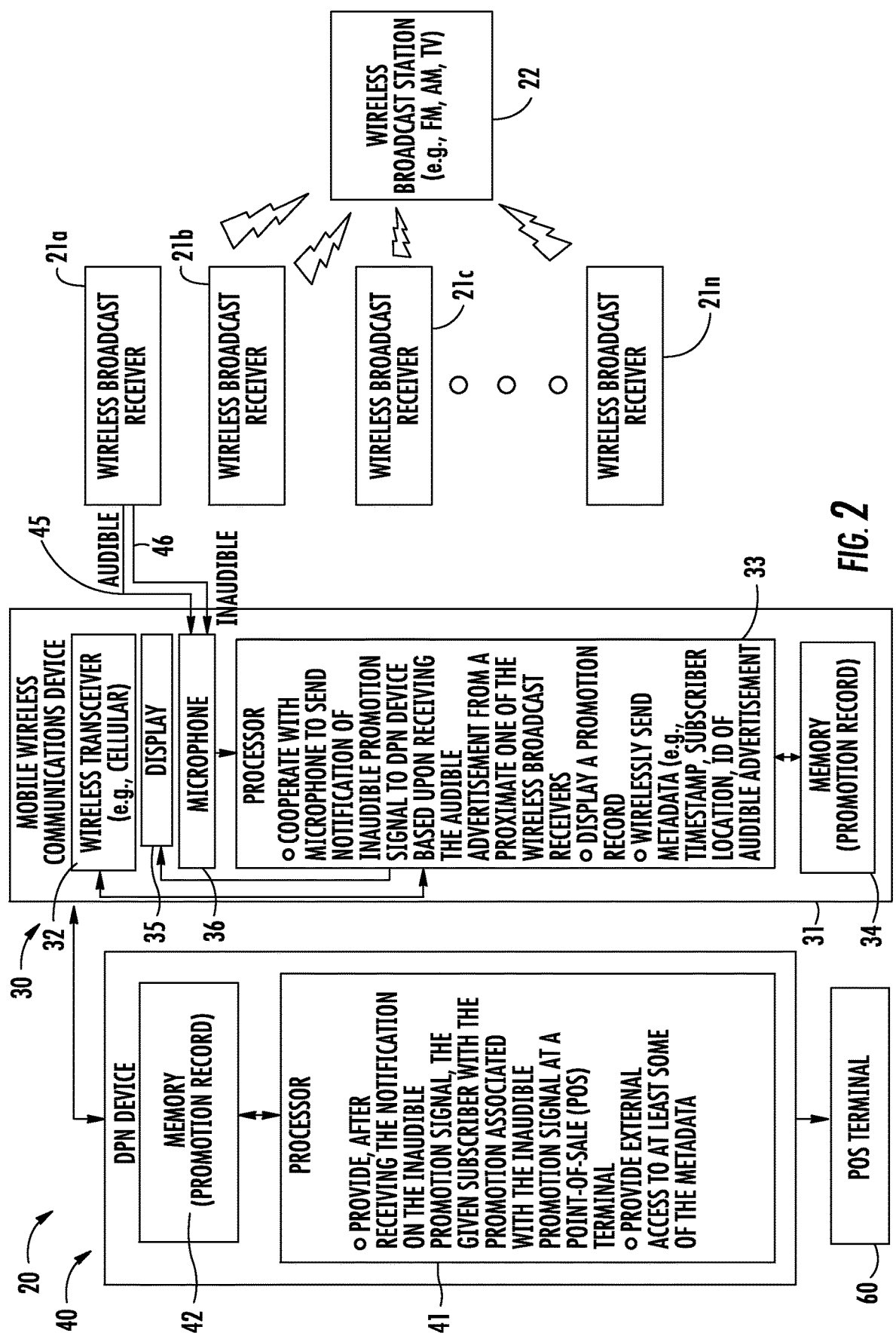
FIG. 2 is a schematic block diagram of the system of FIG. 1.

Referring initially to FIGS. 1 and 2, a system 20 illustratively includes wireless broadcast receivers 21a-21n. The system 20 also includes a wireless broadcast station 22. The wireless broadcast station 22 may be any one of an FM radio station, an AM station, and a TV station. Of course, the wireless broadcast station may be any other type of wireless transmitter that causes the wireless broadcast receivers 21a-21n to generate audio.

The wireless broadcast station 22 broadcasts a wireless signal causing each of the wireless broadcast receivers 21a-21n to generate an audible advertisement 45 and an inaudible promotion signal 46 associated therewith. It should be understood that the audible advertisement 45 is generally one that can be heard by a human within the normal range of hearing. The advertisement may be associated with any one or more of a service, product, or general notice, for example, a public service notification. The inaudible promotion signal 46 may be included with the audible advertisement 45 using any of known techniques, as will be understood by those skilled in the art. It should be understood that the inaudible promotion signal 46 is one that cannot generally be heard by a human, for example, and may be data that is associated with the audible advertisement 45. In some embodiments, the wireless broadcast station 22 may configured to broadcast the wireless signal to cause a given wireless broadcast receiver to generate the audible advertisement 45 and inaudible promotion signal 46 at a same time. In other embodiments, the wireless broadcast station 22 may configured to broadcast the wireless signal to cause a given wireless broadcast receiver to generate the audible advertisement 45 to be offset in time from the inaudible promotion signal 46.

The inaudible promotion signal 46 is for promotion subscribers. For example, a user associated with the wireless broadcast receivers 21a-21n may opt-in to subscribe to a service associated with the inaudible promotion signal 46, as will be understood by those skilled in the art.

The system 20 also includes a digital promotions network (DPN) device 40. The DPN device may include a processor 41 and a memory 42 coupled thereto. For example, the DPN device 40 may include one or more computer servers, which may be coupled together via a communications network.

The system 20 also includes a mobile wireless communications device 30 carried by a given subscriber. The mobile wireless communications device 30 includes a portable housing 31, a microphone 36 carried by the portable housing, a wireless transceiver 32, for example, a cellular transceiver, carried by the portable housing, and a processor 33 also carried by the portable housing. The wireless transceiver 32 may be another type of wireless transceiver, as will be appreciated by those skilled in the art. A memory 34 is also coupled to the processor 33. A display 35 is also carried by the portable housing 31 and is coupled to the processor 33. The processor 33 cooperates with the microphone 36 and the wireless transceiver 32 to wirelessly send notification of the inaudible promotion signal to the DPN device 40 based upon receiving the inaudible promotion 46 signal from a proximate one 21a of the wireless broadcast receivers 21a-21n. In other words, the processor 33 may be cooperate with the microphone 36 to, if the mobile wireless communications device 30 is associated with a subscriber, "listen" for the inaudible promotion signal 46, for example, from an adjacent FM radio, etc. Once the inaudible promotion signal is "heard" then, the processor 33 sends notification to the DPN device 40 that the inaudible promotion signal 46 has been heard. The notification or data sent to the DPN device 40 may include metadata relating to the inaudible promotion signal 46, for example, timestamp, date, subscriber location when receiving the inaudible promotion signal, and an identification of the audible advertisement associated with the inaudible promotion signal.

The processor 33 may send the notification to the DPN device 40 via a communications network 50, for example, a cellular communications network, a WiFi data network, or other wireless communications network.

The DPN device 40 is configured to provide, after receiving the notification of the inaudible promotion signal, the given subscriber with the promotion associated with the inaudible promotion signal at a point-of-sale (POS) terminal 60, as will be explained in further detail below.

In some embodiments, the DPN device 40 may send, for example, wirelessly, a promotion record for storage on the memory 34 of the mobile wireless communications device 30. The promotion record may include, for example, the type of promotion, the manufacturer, and the amount of the promotion. Of course, the promotion record may also include promotion expiration and/or usage information or other information associated with the promotion, as will be appreciated by those skilled in the art. Of course, the promotion record may include other and/or additional information associated with the promotion, mobile wireless communications device, and/or given subscriber. The processor 32 of the mobile wireless communications device 30 may display the promotion record on the display 35 thereof. For example, the promotion record may be displayed as an optically recognizable code, i.e., a bar code, on the display 35 for redemption at the point-of-sale (POS) terminal 60.

The DPN device 40 may store a promotion record in its memory 42. The promotion record stored at the DPN device 40 may be provided to the DPN device by a promotion supplier, for example, which may be a retailer, manufacturer, and/or promotion processor that may have external access to the DPN device, either wirelessly or locally, to upload or provide the promotion record. Access to at least some of the metadata may also be provided by the DPN device 40. The DPN device 40 may provide this promotion record to the mobile wireless communications device 30 as described above. In some embodiments, the promotion record sent to the mobile wireless communications device 30 may activate a promotion record stored on the mobile wireless communications device.

At the POS terminal 60, which may be associated with a retailer, for example, the promotion or coupon may be redeemed against a purchase of the goods or services associated with the promotion. The POS terminal 60 may send redemption information to the DPN device 40, for example, a timestamp of redemption and/or a flag indicating that the promotion has been redeemed. The DPN device 40 may also may make this information externally available, and may additionally provide accounting of promotions for a given retailer, supplier, and/or manufacturer, for example.

A method aspect is directed to a method of providing a promotion associated with an inaudible promotion signal 46 at a point-of-sale (POS) terminal 60. The method includes receiving, via the processor 41 of the DPN device 40, a notification of the inaudible promotion signal for promotion subscribers from a mobile wireless communications device 30 carried by a given subscriber. The mobile wireless communications device 30 wirelessly sends the notification of the inaudible promotion signal to the DPN device 40 based upon receiving the inaudible promotion signal 46 from a proximate one 21*a* of wireless broadcast receivers 21*a*-21*n*. The wireless broadcast receivers 21*a*-21*n* each generates an audible advertisement 45 and the inaudible promotion signal 46 associated therewith caused by a wireless broadcast station 22 configured to broadcast a wireless signal. The method also includes providing, via the processor 41, after receiving the notification of the inaudible promotion signal, the given subscriber with the promotion associated with the inaudible promotion signal 46 at the point-of-sale (POS) terminal 60.

Another method aspect is directed to a method of processing a promotion using a mobile wireless communications device 30 carried by a given subscriber of a plurality thereof. The method includes using a processor 33 of the mobile wireless communications device 30 cooperating with a microphone 36 and a wireless transceiver 32 to wirelessly receive an inaudible promotion signal 46 generated by a proximate one of wireless broadcast receivers 21*a*-21*n*. Each of the wireless broadcast receivers 21*a*-21*n* generates an audible advertisement 45 and an inaudible promotion signal 46 associated therewith caused by a wireless broadcast station 22 configured to broadcast a wireless signal. The inaudible promotion signal 46 is for the promotion subscribers. The method also includes using the processor 33 to wirelessly send notification of the inaudible promotion signal to a digital promotions network (DPN) device 40 based upon receiving the inaudible promotion signal from the proximate one 21*a* of the wireless broadcast receivers 21*a*-21*n* so that the DPN device provides, after receiving the notification of the inaudible promotion signal, the given subscriber with the promotion associated with the inaudible promotion signal at a point-of-sale (POS) terminal 60.

Figure 3:
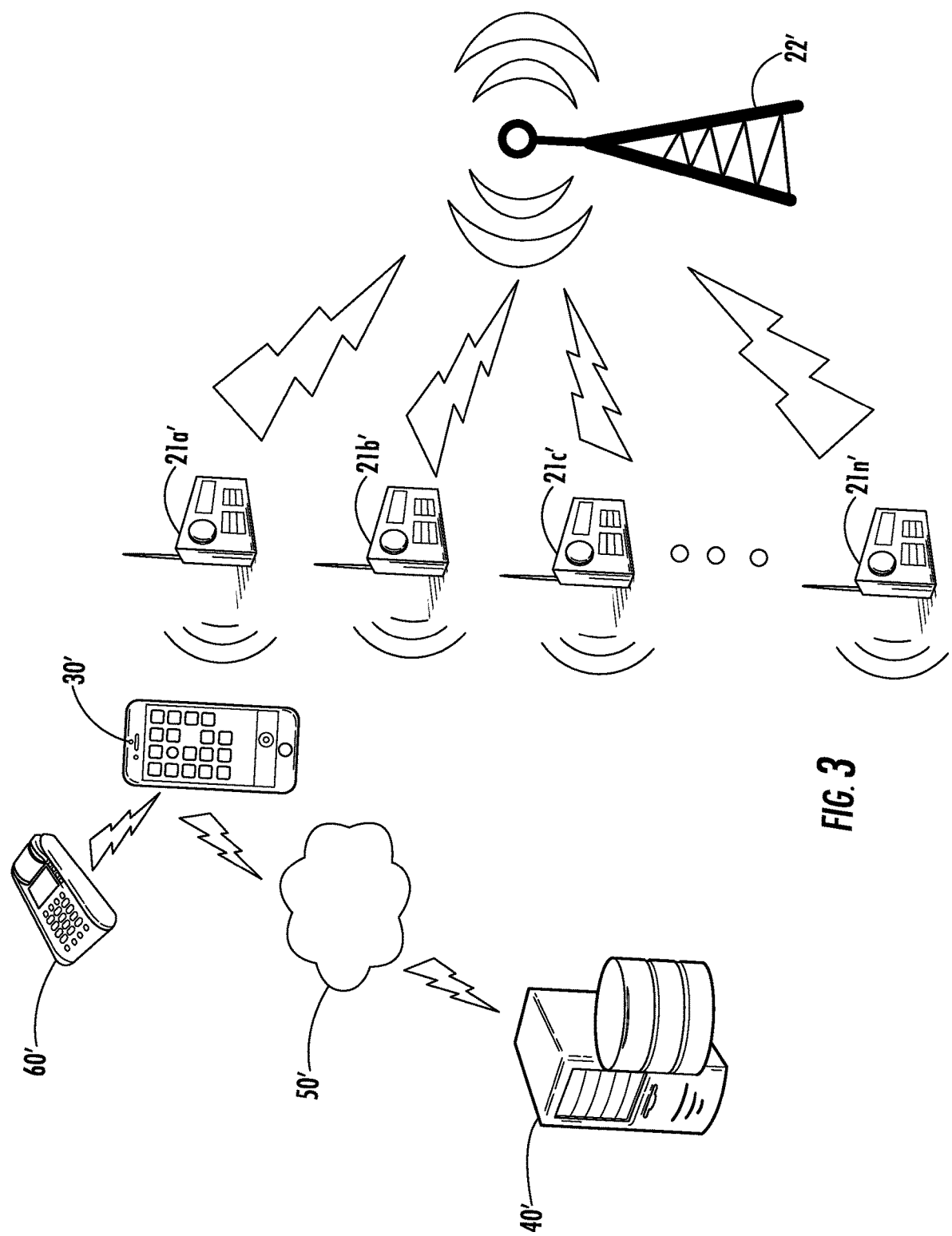
FIG. 3 is a schematic diagram of a system in accordance with another embodiment of the present invention.
Figure 4:
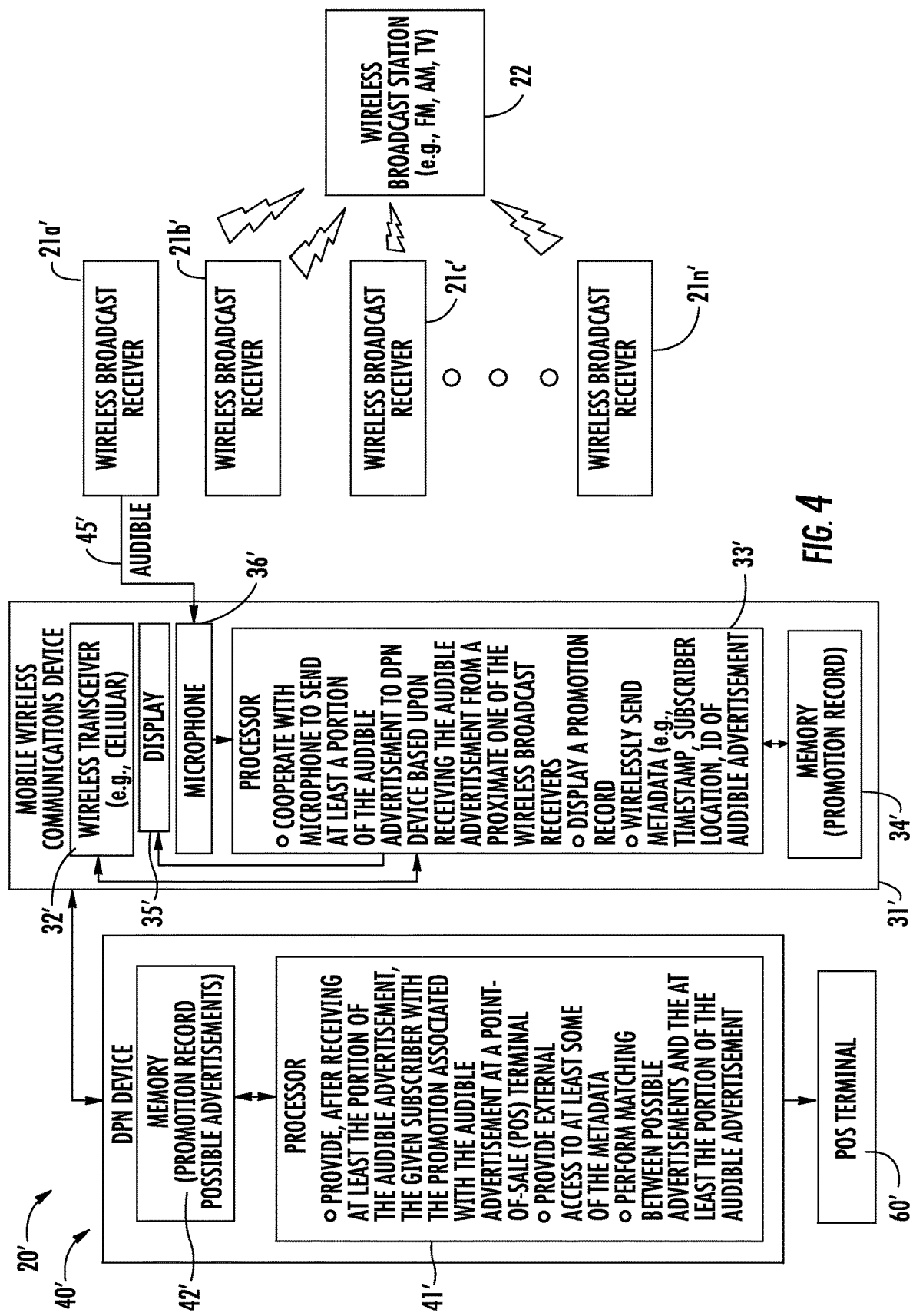
FIG. 4 is a schematic block diagram of the system of FIG. 3.

Referring now to FIGS. 3 and 4, a system 20' according to another embodiment is illustrated. The system 20' includes wireless broadcast receivers 21*a'*-21*n'*. The system 20' also includes a wireless broadcast station 22'. The wireless broadcast station 22' may be any one of an FM radio station, an AM station, and a TV station. Of course, the wireless broadcast station 22' may be any other type of wireless transmitter that causes the wireless broadcast receivers 21*a'*-21*n'* to generate audio.

The wireless broadcast station 22' broadcasts a wireless signal causing each of the wireless broadcast receivers 21*a'*-21*n'* to generate an audible advertisement 45' having a promotion associated therewith. It should be understood that the audible advertisement 45' is generally one that can be heard by a human within the normal range of hearing. The audible advertisement 45' may be associated with any one or more of a service, product, or general notice, for example, a public service notification.

The promotion is for subscribers. For example, a user associated with the wireless broadcast receivers 21*a'*-21*n'* may opt-in to subscribe to a service associated with the promotion, as will be appreciated by those skilled in the art.

The system 20' also includes a digital promotions network (DPN) device 40'. The DPN device 40' may include a processor 41' and a memory 42' coupled thereto. For example, the DPN device 40' may include one or more computer servers, which may be coupled together via a communications network.

The system 20' also includes a mobile wireless communications device 30' carried by a given subscriber. The mobile wireless communications device 30' includes a portable housing 31', a microphone 36' carried by the portable housing, a wireless transceiver 32', for example, a cellular transceiver, carried by the portable housing, and a processor 33' also carried by the portable housing. The wireless transceiver 32' may be another type of wireless transceiver, as will be appreciated by those skilled in the art. A memory 34' is also coupled to the processor 33'. A display 35' is also carried by the portable housing 31' and is coupled to the processor 33'. The processor 33' cooperates with the microphone 32' and the wireless transceiver 32' to wirelessly send at least a portion of the audible advertisement 45' to the DPN device 40' based upon receiving the audible advertisement from a proximate one 21*a'* of the wireless broadcast receivers 21*a'*-21*n'*. In other words, the processor 33' may be cooperate with the microphone 36' to, if the mobile wireless communications device 30' is associated with a subscriber, "listen" for the audible advertisement 45', for example, from an adjacent FM radio, etc. Once the audible advertisement 45' is "heard" then, the processor 33' sends at least a portion of the audible advertisement to the DPN device 40'. The DPN device 40' matches the portion of the audible advertisement sent against possible audible advertisements stored in the memory 42' of the DPN 40'. Other data may be sent to the DPN device 40' in addition to the portion of the audible advertisement, for example, metadata, which may include a timestamp, a date, and a subscriber location when receiving the audible advertisement. Of course, other or additional information may be sent from the mobile wireless communications device 30' to the DPN device 40' along with the portion of the audible advertisement, or no other data may be sent. Moreover, the entire audible advertisement 45' may be sent to the DPN device 40' from the mobile wireless communications device 30' in some embodiments.

The processor 33' may send the portion of the audible advertisement to the DPN device 40' via a communications network 50', for example, a cellular communications network, a WiFi data network, or other wireless communications network.

The DPN device 40' is configured to provide, after receiving the portion of the audible advertisement and matching the portion of the audible advertisement to stored possible advertisements, the given subscriber with the promotion associated with the audible advertisement at a point-of-sale (POS) terminal 60', as will be explained in further detail below.

In some embodiments, the DPN device 40' may send, for example, wirelessly, a promotion record for storage on the memory 34' of the mobile wireless communications device 30', for example, upon a matching of the audible advertisement 45' to the possible audible advertisements. The promotion record may include, for example, the type of promotion, the manufacturer, and the amount of the promotion. Of course, the promotion record may also include promotion expiration and/or usage information or other information associated with the promotion, as will be appreciated by those skilled in the art. Of course, the promotion record may include other and/or additional information associated with the promotion, mobile wireless communications device, and/or given subscriber. The processor 33' of the mobile wireless communications device 30' may display the promotion record on the display 35' thereof. For example, the promotion record may be displayed as an optically recognizable code, i.e., a bar code, on the display 35' for redemption at the point-of-sale (POS) terminal 60'.

The DPN device 40' may store a promotion record in its memory 42'. The promotion record stored at the DPN device 40' may be provided to the DPN device by a promotion supplier, for example, which may be a retailer, manufacturer, and/or promotion processor that may have external access to the DPN device, either wirelessly or locally, to upload or provide the promotion record. Access to at least some of the metadata may also be provided by the DPN device 40'. The DPN device 40' may provide this promotion record to the mobile wireless communications device 30' as described above. In some embodiments, the promotion record sent to the mobile wireless communications device 30' may activate a promotion record stored on the mobile wireless communications device.

At the POS terminal 60', which may be associated with a retailer, for example, the promotion or coupon may be redeemed against a purchase of the goods or services associated with the promotion. The POS terminal 60' may send redemption information to the DPN device 40', for example, a timestamp of redemption and/or a flag indicating that the promotion has been redeemed. The DPN device 40' may also may this information externally available, and may additionally provide accounting of promotions for a given retailer, supplier, and/or manufacturer, for example.

A method aspect is directed to a method of providing a promotion associated with an audible advertisement 45' at a point-of-sale (POS) terminal 60'. The method includes receiving, via a processor 41' of a digital promotion network (DPN) device 40', at least a portion of an audible advertisement for a plurality of promotion subscribers from a mobile wireless communications device 30' carried by a given subscriber. The mobile wireless communications device 30' wirelessly sends the at least a portion of the audible advertisement to the DPN device 40' based upon receiving the audible advertisement 45' from a proximate one 21' of a plurality of wireless broadcast receivers 21a'-21n'. The plurality of wireless broadcast receivers 21a'-21n' each generates the audible advertisement 45' based upon a wireless broadcast station 22' configured to broadcast a wireless signal. The method also includes providing, via the processor 41', after receiving the at least a portion of the audible advertisement, the given subscriber with the promotion associated with the audible advertisement at the point-of-sale (POS) terminal 60'.

Another method aspect is directed to a method of processing a promotion using a mobile wireless communications device 30' carried by a given subscriber of a plurality thereof. The method includes using a processor 33' cooperating with a microphone 35' and a wireless transceiver 32' to wirelessly receive at least a portion of an audible advertisement 45' generated by a proximate one 21a' of a plurality of wireless broadcast receivers 21a'-21n'. Each of the plurality of wireless broadcast receivers 21a'-21n' generates the audible advertisement 45' based upon a wireless broadcast station 22' configured to broadcast a wireless signal. The audible advertisement 45' is for the plurality of promotion subscribers. The method also includes using the processor 33' to wirelessly send the at least a portion of the audible advertisement to a digital promotions network (DPN) device 40' based upon receiving the audible advertisement 45' from the proximate 21a' one of the plurality of wireless broadcast receivers 21a'-21n' so that the DPN device 40' provides, after receiving the at least a portion of the audible advertisement, the given subscriber with the promotion associated with the audible advertisement at a point-of-sale (POS) terminal 60'.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments may be embodied as methods, systems, and/or computer program products. Accordingly, exemplary embodiments may be embodied in hardware and/or in software (including firmware, resident software, micro-code, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "mobile device" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. A mobile device may also include a frequency modulated (FM), amplitude modulated (AM), and/or satellite radio receiver for receiving radio transmissions. Mobile devices may also be referred to as "pervasive computing" devices.

Some embodiments are described herein with respect to a product manufacturer, retailer, wholesaler, and/or service provider broadcasting an advertisement or commercial for the product and/or service over a first communication channel. The communication channel may include, but is not limited to, an AM radio channel, an FM radio channel, a satellite radio channel, a television channel, and an Internet communication session. Various types of media may be used to carry the communication channel including, but not limited to, air interfaces, optical cable, and wireline cable. The manufacturer, retailer, wholesaler, and/or service provider may also broadcast one or more digital promotions associated with the advertisement/commercial on a second communication channel. Thus, the first and second communication channels are associated with each other, but can be received and processed separately and, therefore, may be viewed as separate communication bands. For example, a consumer may listen to a commercial for a product on a radio station channel and have a mobile device with an application thereon that may receive one or more digital promotions via a cellular network, for example, which are associated with the product and/or service being advertised. The consumer may then elect to accept the one or more digital promotions received at the mobile device, which can be used in purchasing the product or service. The digital promotions may include, but are not limited to, a coupon, a rebate, a discount on buying multiple items or using a service multiple times, e.g., buy one, get one free, and other types of incentives for the product or service. The consumer may also communicate the one or more digital promotions to a digital promotion network to associate the one or more digital promotions with loyalty program(s) of retailers or service providers through which the one or more digital promotions may be redeemed. The consumer may also add the one or more digital promotions to a digital wallet or other suitable application or device used to facilitate commercial transactions.

Figure 5:
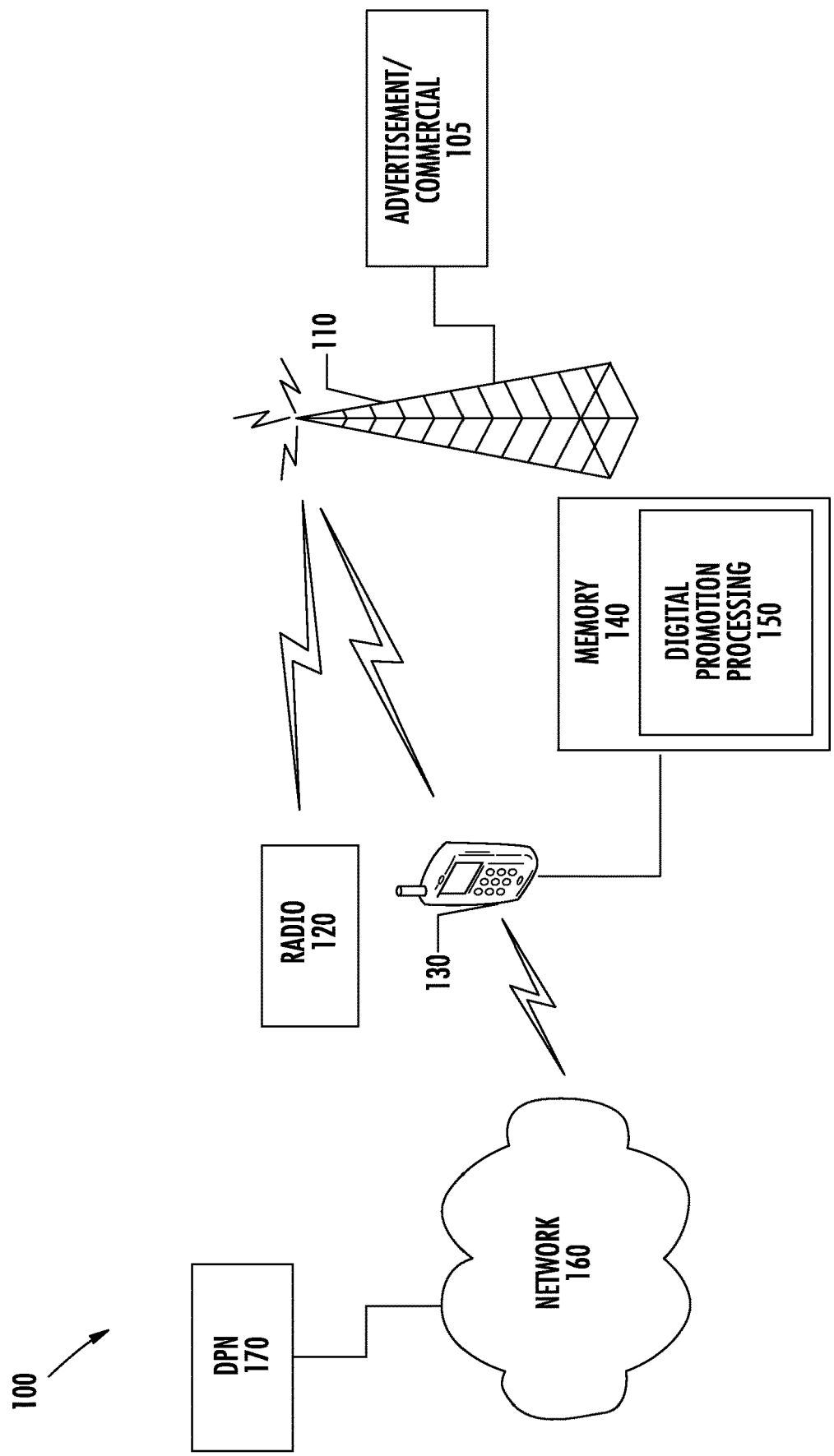
FIG. 5 is a schematic block diagram of a system according to an embodiment of the present invention.

Referring now to FIG. 5, a communication network 100 includes a transmitter 110 through which a manufacturer, retailer, and/or service provider may broadcast or transmit advertisements and/or commercials 105 to one or more consumers. In the example shown, the transmitter 110 represents both a radio transmitter for transmitting AM and/or FM broadcasts, for example, along with a cellular or wireless base station for transmitting and/receiving wireless radio frequency telephone signals. The advertisement/commercial 105 transmission on an AM and/or FM radio channel may be received and played on a consumer's radio 120. While the advertisement/commercial is playing on the radio 120, one or more digital promotions may be transmitted on a separate communication channel via the cellular network, for example, which can be received at the consumer's mobile device 130. The mobile device 130 may be, for example, the consumer's mobile telephone.

The mobile device 130 is equipped with a memory 140 that is representative of the one or more memory devices containing the software and data used to process digital promotions. As shown in FIG. 5, the memory may contain a digital promotion processing module 150 that is configured to receive the one or more digital promotions transmitted on the cellular channel during broadcast of an advertisement/commercial on the AM/FM radio channel. The digital promotion processing module 150 may present the user with the opportunity to accept the one or more digital promotions, which can then be, for example, saved in memory 140 to be printed, added to the user's digital wallet, and/or forwarded to the digital promotions network (DPN) 170 via the network 160. The digital promotions may have metadata associated therewith, such as a timestamp, consumer location, and/or an identification of the commercial/advertisement that was playing when the one or more digital promotions were received at the mobile device 130.

The network 160 may represent a global network, such as the Internet, or other publicly accessible network. The network 160 may also, however, represent a wide area network, a local area network, an Intranet, or other private network, which may not accessible by the general public. Furthermore, the network 160 may represent a combination of public and private networks or a virtual private network (VPN).

The digital promotions network 170 may be configured to manage loyalty programs for retailers, manufacturers, and/or service providers, generate the offers/promotion, handle the redemption of coupons, rewards, and track/analyze the behavior, e.g., purchases, of consumers. The one or more digital promotions received from the mobile device 130 may be added to the consumer's loyalty program accounts for any retailers and/or service providers, for example, that may redeem the digital promotions. The metadata associated with the one or more digital promotions, such as the timestamp, consumer location, and/or the identification of the commercial/advertisement may also be saved in the DPN 170. When the one or more digital promotions are redeemed or expire, for example, the DPN 170 may correlate that information with the metadata and provide the correlated data to the manufacturer, retailer, and/or service provider responsible for the advertisement/commercial, which may allow manufacturer, retailer, and/or service provider to better evaluate the efficacy of the advertisement/commercial.

Although FIG. 5 illustrates an exemplary communication network and an exemplary hardware/software architecture that may be used in a data processing system, such as the mobile device 130 for processing digital promotions, it will be understood that embodiments of the present invention are not limited to such a configuration but are intended to encompass any configuration capable of carrying out operations as described herein.

Computer program code for carrying out operations of data processing systems and servers described above with respect to FIG. 5, such as the anomaly detection server 160, may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

Exemplary embodiments are described herein with reference to flowchart and/or block diagram illustrations of methods, systems, and computer program products in accordance with exemplary embodiments. These flowchart and/or block diagrams further illustrate exemplary operations for using out-of-band signaling to deliver digital promotions in conjunction with a commercial/advertisement in accordance with some embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 6:
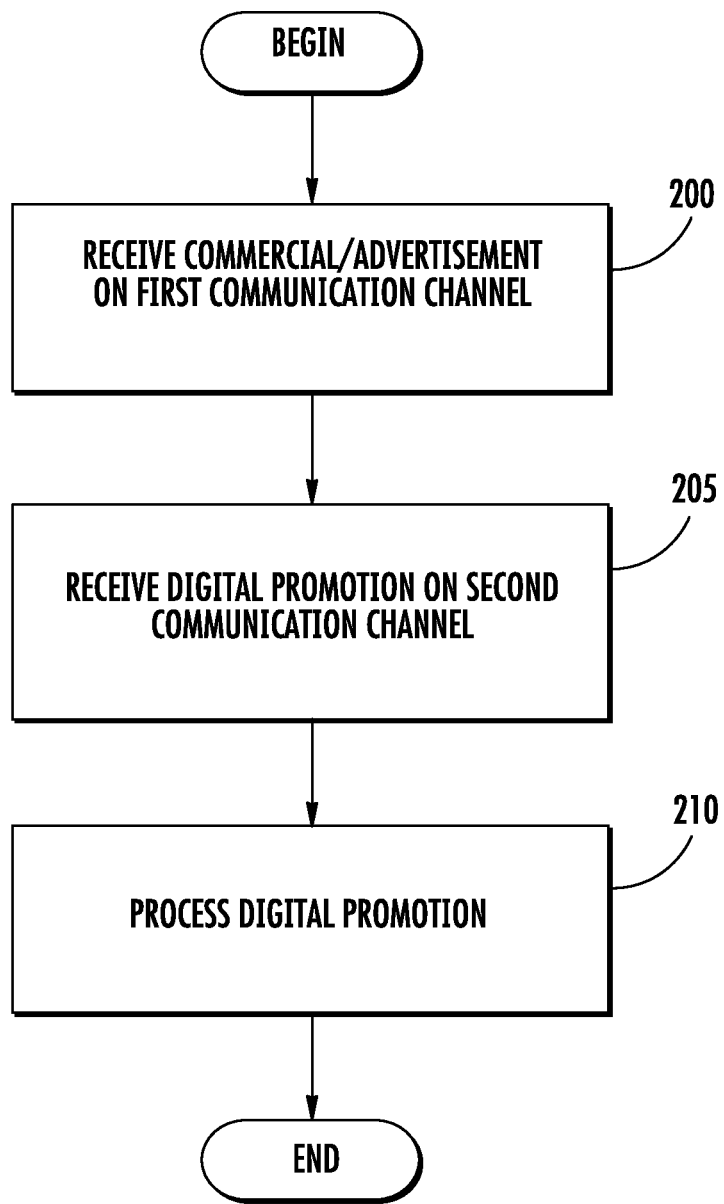
FIG. 6 is a flow chart of a method according to an embodiment of the present invention.

Referring now to FIG. 6, exemplary operations for using out-of-band signaling to deliver digital promotions in conjunction with a commercial/advertisement begin at block 200 where a consumer receives a commercial/advertisement on a first communication channel, such as an AM/FM radio advertisement/commercial on a radio 120. At block 205, the consumer may also receive a digital promotion on a second communication channel while the advertisement/commercial is playing on the first communication channel. The first and second communication channels may be considered to be out-of-band with respect to each other as they can be processed separately and in parallel to obtain the information transmitted thereon. In the example shown in FIG. 5, the digital promotion is transmitted on a cellular communication channel for reception by the consumer's mobile device 130. The mobile device 130 may then process the digital promotion at block 210 by saving the digital promotion to memory for printing or scanning at a point-of-sale terminal, for example. The mobile device 130 may also save the digital promotion in a digital wallet or similar application that facilitates commercial transactions. In still other embodiments, the mobile device 130 may forward digital promotion along with metadata associated therewith, such as the timestamp, consumer location, and/or the identification of the commercial/advertisement, to a DPN 170 where the information may be associated with one or more loyalty programs for redemption of the promotion.

Figure 7:
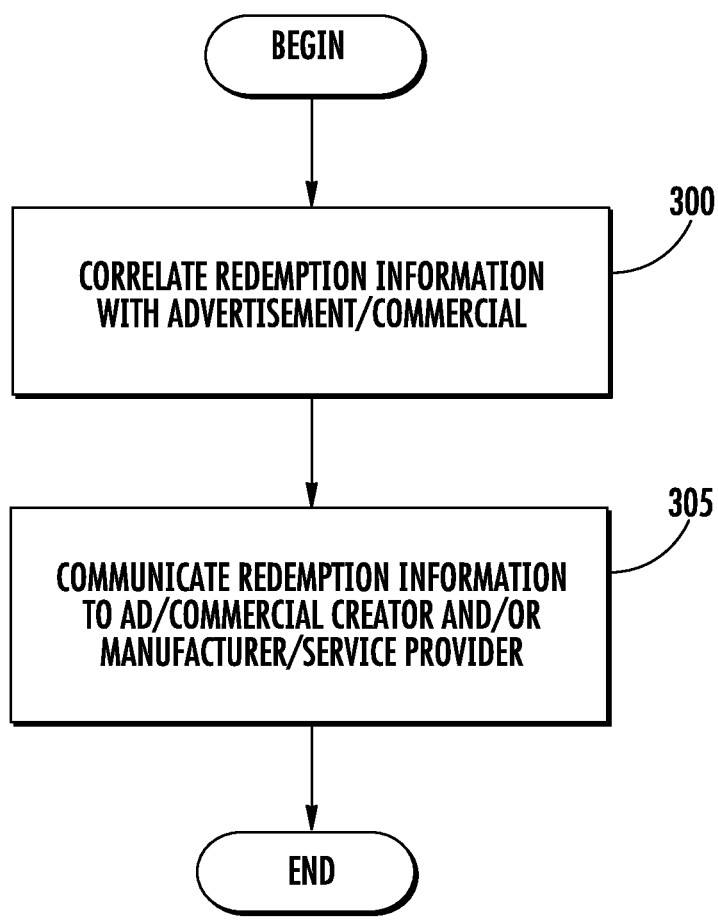
FIG. 7 is a flow chart of a method according to another embodiment of the present invention.

Referring now to FIG. 7, the DPN 170 may correlate redemption information for the promotion, including whether the promotion expires or is discarded without being redeemed, with the metadata associated with the promotion, such as the timestamp, consumer location, and/or the identification of the commercial/advertisement, at block 300. The DPN 170 may then communicate the correlated redemption information with the promotion metadata to the manufacturer, retailer, and/or service provider responsible for the advertisement/commercial. This may allow the effectiveness of the advertisement/commercial to be better evaluated and may include metrics based on time, date, and geography.

The flowchart of FIGS. 6 and 7 illustrates the architecture, functionality, and operations of some embodiments of methods, systems, and computer program products for using out-of-band signaling to deliver digital promotions in conjunction with a commercial/advertisement. In this regard, each block represents a module, segment, or portion of code, which comprises one or more executable instructions for implementing the specified logical function(s). It should also be noted that in other implementations, the function(s) noted in the blocks may occur out of the order noted in FIGS. 6 and 7. For example, two blocks shown in succession may, in fact, be executed substantially concurrently or the blocks may sometimes be executed in the reverse order, depending on the functionality involved.

Although described above with respect to the two communication channels for transmitting a commercial/advertisement in conjunction with one or more digital promotions, respectively, being an AM/FM radio channel and a cellular radio-telephone channel, it will be understood that embodiments of the present invention are not limited to this architecture. Various types of communication channels can be used and a single device may be configured to receive and process both communication channels in some embodiments. For example, the advertisement/commercial may be broadcast on a broadcast, cable, or satellite television channel, which may be listened to and viewed on a smart television. The smart television may also be configured to receive a second channel that includes one or more digital promotions associated with the product/service advertised on the advertisement/commercial. The smart television may be further configured to communicate the digital promotion(s) to other user devices or the DPN 170. In other embodiments, the advertisement/commercial may be transmitted via an Internet communication session via a web-browser and the digital promotion(s) may be transmitted via pop-up windows that are triggered when the advertisement/commercial is being played.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system comprising:
a plurality of wireless broadcast receivers;
a wireless broadcast station configured to broadcast a wireless signal causing each of the plurality of wireless broadcast receivers to generate an audible advertisement and an inaudible promotion signal associated therewith, the promotion signal being for a plurality of promotion subscribers;
a digital promotions network (DPN) device; and
a mobile wireless communications device carried by a given subscriber and comprising
a microphone,
a wireless transceiver, and
a processor cooperating with said microphone and said wireless transceiver to wirelessly send notification of the inaudible promotion signal to the DPN device based upon receiving the inaudible promotion signal from a proximate one of said plurality of wireless broadcast receivers;
said DPN device configured to provide, after receiving the notification of the inaudible promotion signal, the given subscriber with the promotion associated with the inaudible promotion signal for redemption at a point-of-sale (POS) terminal.

2. The system of claim 1 wherein said mobile wireless communications device comprises a memory coupled to said processor; and wherein said DPN device is configured to send a promotion record for storage on said memory.

3. The system of claim 1 wherein said DPN device is configured to store a promotion record.

4. The system of claim 1 wherein said mobile wireless communications device comprises a display coupled to said processor; and wherein said processor is configured to display a promotion record on said display.

5. The system of claim 1 wherein said processor cooperates with said wireless transceiver to wirelessly send metadata relating to the inaudible promotion signal to said DPN device.

6. The system of claim 5 wherein the metadata comprises at least one of a timestamp, a subscriber location, and an identification of the audible advertisement.

7. The system of claim 5 wherein said DPN device is configured to provide external access to at least some of the metadata.

8. The system of claim 1 wherein said wireless broadcast station is configured to broadcast the wireless signal to cause a given wireless broadcast receiver to generate the audible advertisement and inaudible promotion signal at a same time.

9. The system of claim 1 wherein said wireless broadcast station comprises one of an FM radio station, an AM station, and a TV station.

10. The system of claim 1 wherein said wireless transceiver comprises a cellular transceiver.

11. A digital promotions network (DPN) device comprising:
a memory and a processor coupled thereto, said processor configured to
receive a notification of an inaudible promotion signal for a plurality of promotion subscribers from a mobile wireless communications device carried by a given subscriber, the mobile wireless communications device wirelessly sending the notification of the inaudible promotion signal to the DPN device based upon receiving the inaudible promotion signal from a proximate one of a plurality of wireless broadcast receivers, the plurality of wireless broadcast receivers each generating an audible advertisement and the inaudible promotion signal associated therewith caused by a wireless broadcast station configured to broadcast a wireless signal, and
provide, after receiving the notification of the inaudible promotion signal, the given subscriber with a promotion associated with the inaudible promotion signal for redemption at a point-of-sale (POS) terminal.

12. The DPN device of claim 11 wherein said processor is configured to send a promotion record for storage on the mobile wireless communications device.

13. The DPN device of claim 11 wherein said processor is configured to store a promotion record in said memory.

14. The DPN device of claim 11 wherein said processor is configured to wirelessly receive metadata relating to the inaudible promotion signal from the mobile wireless communications device.

15. The DPN device of claim 14 wherein the metadata comprises at least one of a timestamp, a subscriber location, and an identification of the audible advertisement.

16. The DPN device of claim 14 wherein said processor is configured to provide external access to at least some of the metadata.

17. A mobile wireless communications device carried by a given subscriber of a plurality thereof and comprising:
a microphone;

a display;
at least one input device;
a wireless transceiver; and
a processor cooperating with said microphone, said wireless transceiver, said display, and said at least one input device to
wirelessly receive an inaudible promotion signal generated by a proximate one of a plurality of wireless broadcast receivers, each of the plurality of wireless broadcast receivers generating an audible advertisement and an inaudible promotion signal associated therewith caused by a wireless broadcast station configured to broadcast a wireless signal, the inaudible promotion signal being for the plurality of promotion subscribers, and
wirelessly send notification of the inaudible promotion signal to a digital promotions network (DPN) device based upon receiving the inaudible promotion signal from the proximate one of the plurality of wireless broadcast receivers so that the DPN provides, after receiving the notification of the inaudible promotion signal, the given subscriber with a promotion associated with the inaudible promotion signal for redemption at a point-of-sale (POS) terminal,
display the promotion on said display,
permit the given subscriber to accept the promotion via said at least one input device, and
when the given subscriber accepts the promotion, add the promotion to a digital wallet associated with the given subscriber.

18. The mobile wireless communications device of claim 17 further comprising a memory coupled to said processor; and wherein the DPN device is configured to send the promotion for storage on said memory.

19. The mobile wireless communications device of claim 17 wherein said processor cooperates with said wireless transceiver to wirelessly send metadata relating to the inaudible promotion signal to the DPN device.

20. The mobile wireless communications device of claim 19 wherein the metadata comprises at least one of a timestamp, a subscriber location, and an identification of the audible advertisement.

21. The mobile wireless communications device of claim 17 wherein said wireless transceiver comprises a cellular transceiver.

22. A method of providing a promotion associated with an inaudible promotion signal for redemption at a point-of-sale (POS) terminal, the method comprising:
receiving, via a processor of a digital promotion network (DPN) device, a notification of the inaudible promotion signal for a plurality of promotion subscribers from a mobile wireless communications device carried by a given subscriber, the mobile wireless communications device wirelessly sending the notification of the inaudible promotion signal to the DPN device based upon receiving the inaudible promotion signal from a proximate one of a plurality of wireless broadcast receivers, the plurality of wireless broadcast receivers each generating an audible advertisement and the inaudible promotion signal associated therewith caused by a wireless broadcast station configured to broadcast a wireless signal; and
providing, via the processor, after receiving the notification of the inaudible promotion signal, the given subscriber with the promotion associated with the inaudible promotion signal at the point-of-sale (POS) terminal.

23. The method of claim 22 further comprising sending, using the processor, a promotion record for storage on the mobile wireless communications device.

24. The method of claim 22 further comprising using the processor to store a promotion record in a memory coupled to the processor.

25. The method of claim 22 further comprising wirelessly receiving metadata relating to the inaudible promotion signal from the mobile wireless communications device.

26. The method of claim 25 wherein the metadata comprises at least one of a timestamp, a subscriber location, and an identification of the audible advertisement.

27. The method of claim 25 further comprising providing external access to at least some of the metadata.

28. A method of processing a promotion using a mobile wireless communications device carried by a given subscriber of a plurality thereof, the method comprising:
using a processor cooperating with a microphone, a display, at least one input device, and a wireless transceiver to
wirelessly receive an inaudible promotion signal generated by a proximate one of a plurality of wireless broadcast receivers, each of the plurality of wireless broadcast receivers generating an audible advertisement and an inaudible promotion signal associated therewith caused by a wireless broadcast station configured to broadcast a wireless signal, the inaudible promotion signal being for the plurality of promotion subscribers,
wirelessly send notification of the inaudible promotion signal to a digital promotions network (DPN) device based upon receiving the inaudible promotion signal from the proximate one of the plurality of wireless broadcast receivers so that the DPN device provides, after receiving the notification of the inaudible promotion signal, the given subscriber with the promotion associated with the inaudible promotion signal for redemption at a point-of-sale (POS) terminal,
display the promotion on the display,
permit the given subscriber to accept the promotion via the at least one input device, and
when the given subscriber accepts the promotion, add the promotion to a digital wallet associated with the given subscriber.

29. The method of claim 28 further comprising using the processor of said mobile wireless communications device to receive a promotion record from the DPN device and store the promotion in a memory coupled to the processor.

30. The method of claim 28 further comprising using the processor to cooperate with the wireless transceiver to wirelessly send metadata relating to the inaudible promotion signal to the DPN device.

31. The method of claim 30 wherein the metadata comprises at least one of a timestamp, a subscriber location, and an identification of the audible advertisement.

32. The method of claim 28 wherein the wireless transceiver comprises a cellular transceiver.

* * * * *